United States Patent
Mohammed et al.

(10) Patent No.: US 9,727,439 B2
(45) Date of Patent: Aug. 8, 2017

(54) TRACKING APPLICATION DEPLOYMENT ERRORS VIA CLOUD LOGS

(71) Applicant: VMware, Inc., Palo Alto, CA (US)

(72) Inventors: Intesar Mohammed, Santa Clara, CA (US); Vishwas Nagaraja, Sunnyvale, CA (US)

(73) Assignee: VMware, Inc., Palo Alto, CA (US)

(*) Notice: Subject to any disclaimer, the term of this patent is extended or adjusted under 35 U.S.C. 154(b) by 27 days.

(21) Appl. No.: 14/289,231

(22) Filed: May 28, 2014

(65) Prior Publication Data

US 2015/0347264 A1    Dec. 3, 2015

(51) Int. Cl.
G06F 11/00    (2006.01)
G06F 11/34    (2006.01)
(Continued)

(52) U.S. Cl.
CPC ............ *G06F 11/3476* (2013.01); *G06F 8/60* (2013.01); *G06F 9/45558* (2013.01); *G06F 11/0709* (2013.01); *G06F 11/0712* (2013.01); *G06F 11/0784* (2013.01); *G06F 11/3006* (2013.01); *H04L 41/069* (2013.01); *H04L 67/10* (2013.01);
(Continued)

(58) Field of Classification Search
CPC .. G06F 11/14; G06F 11/2205; G06F 11/3476; G06F 11/3006; G06F 11/0766; G06F 11/0709
See application file for complete search history.

(56) References Cited

U.S. PATENT DOCUMENTS 4,975,836 A    12/1990  Hirosawa et al.
6,691,113 B1    2/2004  Harrison et al.
(Continued)

FOREIGN PATENT DOCUMENTS

EP            2383652 A1    11/2011
KR       2012-0013074 A     2/2012
(Continued)

OTHER PUBLICATIONS

U.S. Appl. No. 14/287,366, Final Office Action dated May 19, 2016.
(Continued)

*Primary Examiner* — Matt Kim
*Assistant Examiner* — Katherine Lin
(74) *Attorney, Agent, or Firm* — Patterson & Sheridan LLP

(57) ABSTRACT

A cloud computing environment consists of a cloud deployment platform and a cloud management server configured to manage a plurality of virtual machines deployed in a cloud infrastructure. When a request to deploy an application to the cloud infrastructure is received by the cloud deployment platform, application deployment errors are monitored and tracked. A unique identifier is generated for each virtual machine, and requests to instantiate the virtual machines in the cloud infrastructure are then transmitted. A log containing error records that identify the occurrence of deployment errors is monitored based on the generated virtual machine identifiers, where the deployment errors are detected by the cloud deployment platform or the cloud management server. Based on the monitoring, error messages are generated by the cloud deployment platform.

20 Claims, 5 Drawing Sheets

(51) Int. Cl.
  *G06F 11/30* (2006.01)
  *H04L 29/08* (2006.01)
  *G06F 9/455* (2006.01)
  *G06F 11/07* (2006.01)
  *G06F 9/445* (2006.01)
  *H04L 12/24* (2006.01)

(52) U.S. Cl.
  CPC  *G06F 2009/45591* (2013.01); *H04L 41/5054* (2013.01)

(56) References Cited

U.S. PATENT DOCUMENTS

| | | | |
|---|---|---|---|
| 7,068,680 | B1 | 6/2006 | Kaltenmark et al. |
| 7,549,149 | B2 | 6/2009 | Childress et al. |
| 8,171,470 | B2 | 5/2012 | Goldman et al. |
| 8,495,611 | B2 * | 7/2013 | McCarthy ............ H04L 41/0806 709/203 |
| 8,732,699 | B1 | 5/2014 | Hyser et al. |
| 8,782,744 | B1 | 7/2014 | Fuller et al. |
| 9,081,747 | B1 | 7/2015 | Tabieros et al. |
| 2002/0129242 | A1 | 9/2002 | Abbott |
| 2003/0163686 | A1 | 8/2003 | Ward et al. |
| 2006/0085785 | A1 | 4/2006 | Garrett |
| 2007/0168656 | A1 | 7/2007 | Paganetti et al. |
| 2008/0114984 | A1 | 5/2008 | Srinivasan et al. |
| 2008/0250407 | A1 | 10/2008 | Dadhia et al. |
| 2010/0049968 | A1 | 2/2010 | Dimitrakos et al. |
| 2010/0138823 | A1 | 6/2010 | Thornley |
| 2010/0205205 | A1 | 8/2010 | Hamel |
| 2011/0265164 | A1 | 10/2011 | Lucovsky et al. |
| 2011/0265168 | A1 | 10/2011 | Lucovsky et al. |
| 2011/0295987 | A1 | 12/2011 | Petushkov et al. |
| 2011/0296021 | A1 | 12/2011 | Dorai et al. |
| 2012/0054280 | A1 | 3/2012 | Shah |
| 2012/0054736 | A1 | 3/2012 | Arcese et al. |
| 2012/0170726 | A1 | 7/2012 | Schwartz |
| 2012/0179822 | A1 | 7/2012 | Grigsby et al. |
| 2012/0198438 | A1 | 8/2012 | Auer |
| 2012/0221726 | A1 | 8/2012 | Nguyen |
| 2012/0240112 | A1 | 9/2012 | Nishiguchi et al. |
| 2013/0103837 | A1 | 4/2013 | Krueger |
| 2013/0191528 | A1 | 7/2013 | Heninger et al. |
| 2013/0227091 | A1 | 8/2013 | Tompkins |
| 2013/0227560 | A1 | 8/2013 | McGrath et al. |
| 2013/0232463 | A1 | 9/2013 | Nagaraja et al. |
| 2013/0232480 | A1 | 9/2013 | Winterfeldt et al. |
| 2013/0232497 | A1 | 9/2013 | Jalagam et al. |
| 2013/0232498 | A1 | 9/2013 | Mangtani et al. |
| 2013/0263209 | A1 * | 10/2013 | Panuganty ............. H04L 43/04 726/1 |
| 2013/0268674 | A1 | 10/2013 | Bailey et al. |
| 2013/0297964 | A1 * | 11/2013 | Hegdal ............... G06F 11/0712 714/2 |
| 2014/0013315 | A1 | 1/2014 | Genevski et al. |
| 2014/0019538 | A1 | 1/2014 | Limpaecher et al. |
| 2014/0019621 | A1 | 1/2014 | Khan et al. |
| 2014/0033200 | A1 | 1/2014 | Tompkins |
| 2014/0082166 | A1 | 3/2014 | Robinson et al. |
| 2014/0101318 | A1 * | 4/2014 | Ferris .................... G06F 15/177 709/226 |
| 2014/0201218 | A1 | 7/2014 | Catalano et al. |
| 2014/0201345 | A1 | 7/2014 | Abuelsaad et al. |
| 2014/0215049 | A1 * | 7/2014 | Provaznik ........... H04L 41/0663 709/224 |
| 2014/0279201 | A1 | 9/2014 | Iyoob et al. |
| 2014/0280975 | A1 | 9/2014 | Mordani et al. |
| 2014/0325068 | A1 | 10/2014 | Assuncao et al. |
| 2014/0365662 | A1 | 12/2014 | Dave et al. |
| 2015/0163288 | A1 | 6/2015 | Maes et al. |
| 2015/0347264 | A1 | 12/2015 | Mohammed et al. |
| 2015/0350101 | A1 | 12/2015 | Sinha et al. |

FOREIGN PATENT DOCUMENTS

| | | |
|---|---|---|
| WO | 2013104217 A1 | 7/2013 |
| WO | 2013184134 A1 | 12/2013 |

OTHER PUBLICATIONS

U.S. Appl. No. 14/292,296, Office Action dated May 27, 2016.
U.S. Appl. No. 14/316,517, Office Action dated May 19, 2016.
U.S. Appl. No. 14/315,874, Final Office Action dated Jun. 17, 2016.
U.S. Appl. No. 14/316,507, Office Action dated Jun. 24, 2016.
U.S. Appl. No. 14/292,296, Final Office Action dated Dec. 1, 2016.
U.S. Appl. No. 14/316,517, Final Office Action dated Oct. 11, 2016.
International Search Report and Written Opinion PCT/2015/033044, dated Jul. 9, 2015, Consists of 9 pages.
International Search Report and Written Opinion PCT/2015/033394, dated Jul. 21, 2015, Consists of 9 pages.
International Search Report and Written Opinion PCT/2015/032625, dated Jul. 7, 2015, Consists of 9 pages.
International Search Report and Written Opinion PCT/2015/032924, dated Dec. 31, 2015, Consists of 12 pages.
Chieu, "Solution-based Deployment of Complex Application Services on a Cloud", Jul. 2010, pp. 282-287.
U.S. Appl. No. 14/316,507, Office Action dated May 4, 2017.

* cited by examiner

TRACKING APPLICATION DEPLOYMENT ERRORS VIA CLOUD LOGS

CROSS-REFERENCE TO RELATED APPLICATION

This application is related to the following commonly assigned, co-pending application: "Grouping Virtual Machines in a Cloud Application" (Ser. No. 14/287,366), which was filed on May 27, 2014, and is incorporated by reference herein in its entirety.

BACKGROUND

When virtualized applications (i.e., applications that execute within one or more virtual machines) are deployed to a cloud infrastructure, a number of errors may occur in connection with the deployment. The cloud infrastructure may have insufficient resources available to host virtual machines that are to be deployed for the application. Further, some cloud infrastructures have certain policies with respect to the characteristics of virtual machines that are to be deployed therein. For example, a cloud infrastructure may have a policy that specifies a maximum virtual memory size or a maximum number of virtual central processing units (CPUs) that any virtual machine deployed therein may have. A request to deploy a virtual machine to a cloud infrastructure that lacks sufficient computing resources or that violates a cloud infrastructure policy is usually rejected.

The rejection of a request to deploy a virtual machine in a cloud infrastructure is typically accompanied by the generation of some form of error message, as well as the writing of that error message to a system log. However, the deployer of an application (e.g., a system administrator or application modeler) submits deployment requests from a deployment platform that typically does not have access to the system logs of a cloud computing platform. In some cases, such a deployment platform has the ability to issue deployment requests for several virtual machines, all of which may be associated with a single application. However, cloud infrastructure servers (to which deployment requests are issued) do not maintain associations of virtual machines with applications. Thus, if a deployment request is rejected due to, for example, any of the aforementioned reasons, the deployer of the application has no way of obtaining from the deployment platform any information that indicates why the deployment request was rejected. Further, in the case of a multi-virtual machine application deployment, the application deployer has no way of determining exactly which of the virtual machines of an application failed to deploy. The problem is magnified in situations where an administrator attempts to deploy several complex applications simultaneously.

In most cases, the only way for an administrator to determine why (or even whether) the deployment was rejected (or experienced a serious error) is to attempt to use the improperly deployed application, or, alternatively, to scan the system logs associated with the cloud infrastructure. System logs for a cloud infrastructure are typically very large and cryptic files that contain information pertaining to all activity in the cloud infrastructure, not just a particular deployment. The task of analyzing such logs to determine why a deployment request failed is thus very time consuming.

SUMMARY

A method of tracking errors deploying applications to a cloud computing environment, the cloud computing environment comprising a cloud deployment platform including first and second deployment modules, and a cloud management server configured to manage virtual machines deployed in a cloud infrastructure, is provided. The method includes the step of generating, by the first deployment module, a unique identifier for a first virtual machine. The method further includes the step of transmitting by the first deployment module to the second deployment module a request to deploy the first virtual machine, the request including the virtual machine identifier. Further, the method includes the step of monitoring, by the first deployment module, a log based on the identifier for the first virtual machine, the log containing an error record that identifies an occurrence of a deployment error corresponding to the first virtual machine detected by one of the second deployment module and the cloud management server. The method also includes the step of generating, by the first deployment module, an error message based on the monitoring.

Further embodiments provide a non-transitory computer-readable medium that includes instructions that, when executed, enable a plurality of host computers to implement one or more aspects of the above method.

Further embodiments also provide a virtualized cloud-based computing system that is configured to implement one or more aspects of the above method.

DETAILED DESCRIPTION

Figure 1:
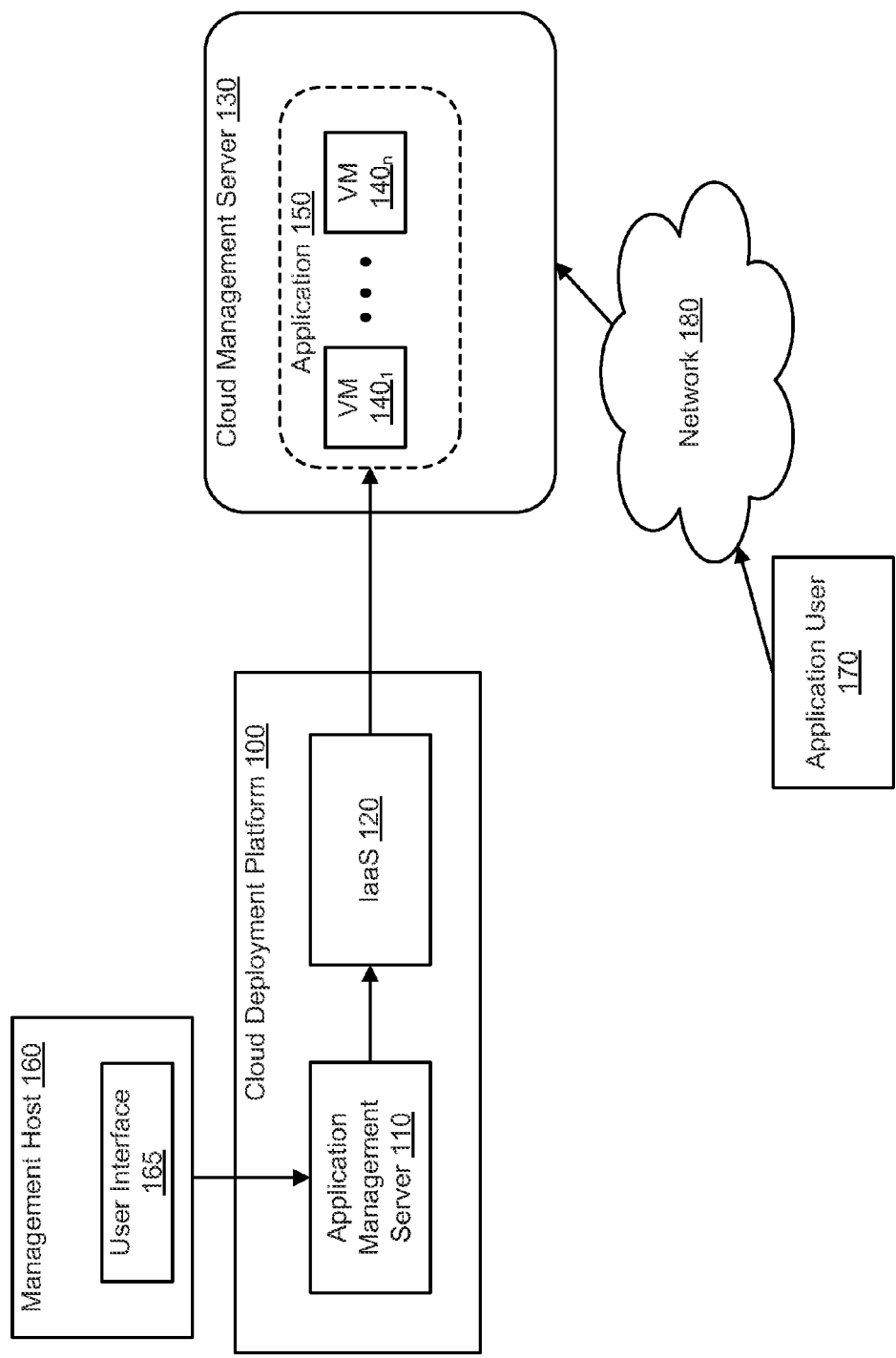
FIG. 1 is a block diagram of components of a virtualized cloud computing environment in which one or more embodiments may be implemented.

FIG. 1 is a block diagram of components of a virtualized cloud computing environment in which one or more embodiments may be implemented. Virtualized cloud computing environments typically comprise one or more computing platforms that support the creation, deployment, and management of virtual machine-based cloud applications. One such platform (referred to herein as a cloud deployment platform) is the vCloud® Automation Center, which is commercially available from VMware, Inc. of Palo Alto, Calif. FIG. 1 depicts cloud deployment platform 100 in the cloud computing environment shown. While vCloud® Automation Center is one example of a cloud deployment platform, it should be noted that any computing platform that supports the creation and deployment of virtualized cloud applications is within the scope of the present invention.

Cloud deployment platforms are usually accessed by an end user (referred to herein as a management user). A management user accesses the cloud deployment platform through, for example, a host computer that communicates with the platform. Such a management host may be directly connected to a computer server that runs software that implements the functionality of the cloud deployment platform. Alternatively, such a management host may connect to the cloud deployment platform over a local-area, wide-area, or wireless network. In FIG. 1, management host 160 may be any client device (i.e., personal computer, workstation, terminal, or mobile device) that connects to and communicates with cloud deployment platform 100. As shown, management host 160 includes user interface 165. In one or more embodiments, user interface 165 is a graphical user interface (GUI) that enables a cloud application designer, using components of cloud application deployment platform 100, to model and deploy virtualized cloud based applications on various cloud computing platforms.

As depicted in the embodiment of FIG. 1, cloud deployment platform 100 includes two components. First, cloud deployment platform 100 includes application management server 110. In one or more embodiments, application management server 110 comprises one or more computer-based processes that implement an application provisioning platform, where such platform supports the creation and deployment of applications in cloud computing environments. Typically, a client of application management server 110 (e.g., management host 160) defines the structure and topology of a cloud-based application. The components that usually comprise a cloud-based application that an end user on management host 160 models and creates include one or more virtual machines, network connections between the virtual machines, and various components of system and application software that run within the virtual machines. As an example, an application designer using management host 160 may wish to define a cloud-based travel reservation system. In such a case, the application designer uses management host 160 to access application management server 110 to model and create the travel reservation system, using user interface 165.

Applications such as the aforementioned travel reservation system may be "multi-tiered." That is, the applications may comprise separate components for presentation, security, data management, application processing, as well as other functions. As an example, the travel reservation application in question may be designed as a "three-tiered" application. In this example, a first tier implements software that presents a user interface to end users (such as travel agents), while a second tier provides for system security. Such a system security tier may store end user login names and passwords, and provide for password encryption. Finally, a third tier may implement application logic. For a travel reservation system, such application logic may include scheduling software, pricing software, and interfaces to external travel providers (such as airlines, bus lines, and cruise lines).

Multi-tiered applications may be modeled in application management server 110 using separate virtual machines (or virtual servers) for each application component. Once an application designer, using management host 160, has modeled an application, application management server 110 generates a "blueprint" (not shown) for the modeled application. In embodiments, the application blueprint specifies, among other things, how the application is to be deployed to a cloud infrastructure. In order to specify how a multi-tiered application (i.e., an application comprising multiple virtual machines) is to be deployed, the application blueprint specifies, among other things, the number of virtual machines to be deployed, the characteristics of each virtual machine (e.g., the amount of random access memory (RAM) and the number of virtual central processing units (CPUs) for each virtual machine), the system or application software that is to be installed on each virtual machine, and the order in which each virtual machine is to be deployed. Using user interface 165, an application designer (or other management user) instructs application management server 110 to commence deployment of a cloud-based application to a cloud infrastructure.

In FIG. 1, cloud deployment platform 100 also includes Infrastructure as a Service (IaaS) 120, which is a component that enables the provisioning of virtualized infrastructure components in a cloud-based computing environment. IaaS 120 is a software component that implements, from the perspective of application management server 110, a catalog of virtualized devices, including virtual machines, virtual switches, and virtual storage devices. In one or more embodiments, these virtualized devices in the catalog are templates. That is, the devices are not instantiated within IaaS 120. Rather, IaaS 120 communicates with a cloud infrastructure server in order to instantiate a virtualized device in the cloud. In this way, a process may communicate with IaaS 120 in order to request the deployment of one or more virtualized devices to a cloud infrastructure.

As just mentioned, IaaS 120 comprises software that, when executed, communicates with a variety of cloud computing infrastructure platforms. Examples of cloud infrastructures that IaaS 120 communicates with include, but are not limited to, Amazon Web Services, Google Cloud, Cisco Cloud Infrastructure, Microsoft Azure, and the vCloud® suite from VMware, Inc. IaaS 120 instructs a server process (referred to generally herein as a cloud management server) to, among other things, instantiate virtual machines in the cloud and install software on the virtual machines.

According to one or more embodiments, when an application designer or system administrator using management host 160 instructs application management server 110 (through user interface 165) to deploy a multi-tiered application to a cloud infrastructure, application management server 110 transmits a request to IaaS 120. The request is received by IaaS 120. IaaS 120 analyzes the request to determine whether the virtualized infrastructure devices (i.e., the virtual machines, switches, etc.) are available in the IaaS "catalog." If the virtualized devices are available in the catalog (represented as templates of such devices), IaaS 120 communicates with a cloud management server to have the devices instantiated in the cloud. For example, IaaS 120 may contain configured and stored templates for virtual machines with certain processing, memory, and storage capacities. In a particular embodiment, IaaS 120 may have stored therein a template for a first type of virtual server with 32 Gigabytes (GB) of random access memory (RAM), and a template for a second type of virtual server with 64 GB of RAM. An application deployment request received from application management server 110 may specify a request for virtual machines of each type. For example, using the example of the travel management server, a request from application management server 110 may specify that the application and user interface servers are to be deployed as 64 GB RAM virtual machines, while the security server is to be deployed as a 32 GB RAM virtual machine. It should be noted that, if the request from application management server 110 specifies a virtualized device, a template of which is unavailable in the IaaS catalog (for example, a 16 GB RAM virtual machine, in the example just mentioned), then IaaS 120 rejects the request from application server 110.

As shown in FIG. 1, IaaS 120 communicates directly with a server process executing on a cloud computing platform (or a cloud "provider"). Cloud computing platforms typically include the computing resources required to support the execution of cloud-based applications. Thus, the infrastructure in a cloud computing platform typically includes physical computing hardware, along with application and system software. Physical computing hardware in the cloud infrastructure typically includes a plurality of server-class host computers, a number of persistent storage devices, and network infrastructure to connect the various hosts and storage devices. Some cloud infrastructure platforms (i.e. platforms that support multiple cloud-based applications) include mechanisms that allow for the balancing and reallocation of virtual and physical hardware resources based on application demand. For simplicity, the cloud computing platform of FIG. 1 is depicted as cloud management server 130. It should be noted that the cloud computing platform itself comprises the physical infrastructure necessary to execute programs on the cloud computing platform. Cloud management server 130 is a collection of computer software and/or hardware that, when executed, manages, among other things, the instantiation of virtual machines in the cloud, as well as load balancing of resources in the cloud.

In one embodiment, cloud management server 130 may comprise the vCenter Server™ and vSphere® program products, which are commercially available from VMware, Inc. In the embodiment shown in FIG. 1, cloud management server 130 comprises one or more computer-based processes that support the instantiation and execution of multiple virtual machines (VMs). Thus, in the figure, VMs $140_1$-$140_n$ are depicted as instantiated in the cloud by cloud management server 130. Note that cloud management server 130 instantiates VMs upon being requested to do so. In the embodiment of FIG. 1, the instantiation request is transmitted to cloud management server 130 by IaaS 120 (which, as mentioned previously, transmits this request upon receiving a request from application server 110). In addition, each of VMs $140_1$-$140_n$ is shown as being a part of application 150. Application 150 is an example of a "multi-tiered" virtualized application, as previously described. In the example shown, each VM 140 in application 150 corresponds to a particular component of a corresponding application that is designed using application management server 110. Again referring to the multi-tiered travel reservation application, an end user that uses user interface 165 of management host 160 defines and models the application in application management server 110, and deploys the application using application management server 110 (in conjunction with IaaS 120). The deployment request received by IaaS 120 triggers a request from IaaS 120 to cloud management server 130 to instantiate one or more VMs on a cloud infrastructure platform. It should be noted that the instantiation of VMs 140 in the cloud is performed by cloud management server 130 at the request of IaaS 120. Further, when VMs 140 are instantiated, each virtual machine is provisioned with an application management server agent that executes therein. Each application management server agent communicates with application management server 110 in order to support the installation of software on the corresponding virtual machine.

According to one or more embodiments, once VMs 140 are instantiated in the cloud by cloud management server 130, subsequent requests (e.g., software installation requests) from application management server 110 are transmitted to IaaS 120. In a typical embodiment, IaaS 120 only communicates with cloud management server 130 in order to instantiate virtual machines in the cloud; IaaS 120, generally, does not handle the installation of software on instantiated VMs. Thus, requests to install software that are received by IaaS 120 from application management server 110 are then forwarded by IaaS 120 to cloud management server 130. According to embodiments, cloud management server 130 then forwards the software installation requests to corresponding application management server agents that are deployed within the virtual machines. The application management agents then handle the installation of any requested software on the instantiated VMs. According to embodiments, the application management agents deployed within the instantiated VMs have access to a repository (not shown) of system and application software from which to request the binary files to install on the VMs. It should be noted that IaaS 120 is the only component of cloud deployment platform 100 that communicates directly with cloud management server 130. Thus, should cloud management server 130 communicate that a particular virtual machine instantiation or software component installation cannot be performed, this information is provided from cloud management server 130 to IaaS 120.

Once a cloud-based application is deployed by application management server 110 to a cloud infrastructure (using IaaS 120 and cloud management server 130), the deployed application may be accessed and used by an application user 170. As shown in FIG. 1, application user 170 accesses the deployed application (shown as application 150) through network 180, which is, in turn, connected to cloud management server 130. In embodiments, cloud management server 130 (i.e., the cloud "provider") makes available a particular application deployed therein via a distinct Uniform Resource Locator (URL). For example, in the case of the travel reservation application, application user 170 accesses one of the VMs of the application, where the accessed VM implements the application user interface.

When an application designer accesses user interface 165 and management host 160 to model and deploy a virtualized cloud-based application, it is possible for a failure to occur in connection with the deployment. Such a failure may occur within cloud deployment platform 100 and/or the failure may occur within the cloud itself (i.e., the failure may occur in connection with a process executed by cloud management server 130). In the past, application designers have lacked a means of detecting errors when deploying cloud-based applications. That is, typical cloud deployment platforms submit requests to deploy applications to a cloud infrastructure, but are not notified of the success or failure of such a deployment request. Indeed, it is often left to an application tester (or end user) to discover whether or not a cloud-based application has been properly deployed. This may be costly. Often, such deployment errors (if they are subtle) may not be discovered until well after an application is deployed, especially if an erroneously deployed function is not executed immediately. Further, cloud-based applications may run for several hours. If a key component of the application (for example, a particular virtual machine) fails to deploy properly, then it makes little sense to deploy the remaining components of the application, even if those components are deployed properly. For example, with respect to the travel reservation application mentioned earlier, it is possible that the user interface and security servers may deploy properly, but an error may occur when deploying the application server. If the request to deploy the application server is made before the request to deploy the user interface and security servers, then deploying the user interface and security servers would be wasteful of system resources. Thus, it is often desirable for an end user that is deploying an application to detect deployment errors in real time (i.e., while the deployment is in progress).

Figure 2:
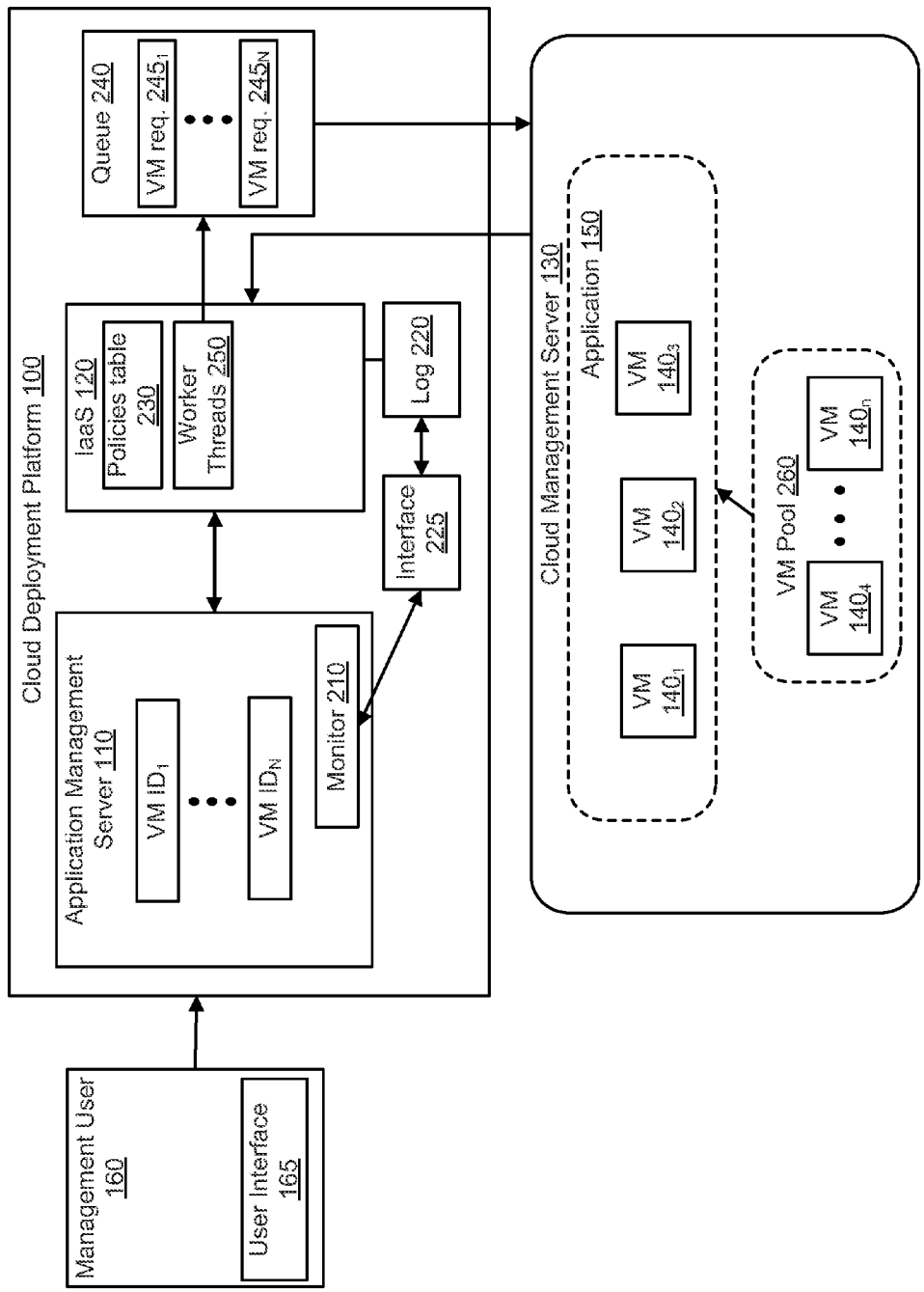
FIG. 2 is a block diagram that illustrates various components of the cloud computing environment that enable the detection of application deployment errors, according to one or more embodiments.

FIG. 2 is a block diagram that illustrates various components of the cloud computing environment that enable an end user that deploys applications to detect deployment errors, according to one or more embodiments. As shown, FIG. 2 depicts management host 160, which includes user interface 165. Further, FIG. 2 depicts cloud deployment platform 100 (including both application management server 110 and IaaS 120), and cloud management server 130. As shown, cloud management server 130 is depicted as a server process running in a cloud infrastructure, and which manages the instantiation of virtual machines in the cloud, as well as initiates installation of software on those virtual machines. The basic functionality of these components was described in connection with FIG. 1, and such description is not repeated here.

FIG. 2 also depicts a plurality of VM identifiers (i.e., VM IDs) within application server 110. In embodiments, when a user of management host 160 models (and, subsequently deploys) a multi-tiered application using application management server 110, application management server 110 generates a virtual machine identifier (or VM ID) for each virtual machine that comprises the multi-tiered application. Application server 110 generates VM IDs (which uniquely identify each VM that is modeled as part of a virtualized cloud-base application) to enable a user of management host 160 to, for example, identify a virtual machine that experiences a failure during deployment of the application of which the virtual machine is a part. For example, in the embodiment of FIG. 2, application server 110 is shown as having generated VM $ID_1$ through VM $ID_N$. To deploy a cloud-based application comprising the N VMs corresponding to VM $ID_1$-VM $ID_N$, application management server 110 transmits one or more deployment requests to IaaS 120 (as described in connection with FIG. 1). The requests transmitted by application management server 110 to IaaS 120 include the corresponding VM IDs. If any of the N VMs specified in a deployment request fails to deploy as a result of an error occurring in IaaS 120 (or in the cloud), then such error may be associated at some point with the particular VM ID corresponding to the VM that failed to properly deploy. This enables application manager 110 to inform an end user that requested the deployment via management host 160 exactly which virtual machine failed.

In addition, embodiments of application management server 110 are configured to create an association among the virtual machines that are part of a single multi-tiered application. In such an embodiment, application management server 110 not only associates an error with a virtual machine, but also associates the error with the application that the virtual machine is part of. Because of this, embodiments of application management server 110 are able to consolidate errors that correspond to all failed virtual machine deployments for a single multi-tiered application. Application management server 110 reports the consolidated errors to an end user via management host 160. Thus, the end user is able to view all errors for a given application deployment in a single interface, which enables the end user to more easily determine the extent of the problems associated with a given application deployment.

Typically, deployment platforms that support the modeling and deployment of virtualized cloud-based applications do not interact directly with processes that execute in the cloud. This makes it difficult for such deployment platforms to capture and communicate deployment errors to an application designer or administrator that requests the deployment of an application. Thus, it is advantageous for the deployment platform to monitor the cloud in order to track the progress of the deployment of any or all of the virtual machines that are specified in a deployment request. As shown in FIG. 2, one or more embodiments of application management server 110 include a monitor 210. Monitor 210, in embodiments, is a software module that, when executed, monitors one or more system log files. In these embodiments, system log files correspond to processes executed by IaaS 120, as well as to requests made by IaaS 120 to cloud management server 130. Thus, if IaaS 120 determines that some error has occurred in connection with a deployment request, then IaaS 120 writes an error message in a system log file that identifies the particular error that occurred.

Further, as previously mentioned, IaaS 120 transmits requests to cloud management server 130 to instantiate one or more virtual machines, and forwards requests from application management server 110 to cloud management server 130 to install software on provisioned virtual machines. There are situations in which cloud management server 130 is unable to satisfy a request. For example, cloud management server 130 may detect that there are not enough available CPU resources in the cloud to support a particular VM instantiation request. In other cases, cloud management server 130 may detect that one or more storage devices are offline. Regardless of the type of error that cloud management server 130 detects, cloud management server 130, upon detecting such error, informs IaaS 120 (i.e., the entity that transmitted the request to cloud management server 130) that an error has occurred. IaaS 120 then, in turn, records the error in the system log file described earlier.

In the embodiment of FIG. 2, IaaS 120 is depicted as accessing log 220. Log 220 is an example of a system log file. In some embodiments, log 220 is a single file stored in a file system accessible to IaaS 120. In other embodiments, log 220 comprises several log files. In still other embodiments, log 220 may be a relational or hierarchical database. It should be noted that log 220 may be any data structure capable of storing a record of system activity. When IaaS 120 detects an error in provisioning one or more VMs to the cloud (whether the error is occurs within IaaS 120, or if the error is transmitted from cloud management server 130 in response to an instantiation request), IaaS 120 writes one or more records to log 220.

As previously mentioned, embodiments of application manager 110 are configured to monitor (through monitor 210) one or more system log files in order to detect deployment errors and to track deployment progress. As shown in FIG. 2, monitor 210 is depicted as accessing log 220 via interface 225. In one or more embodiments, interface 225 is a REST layer (i.e., a layer that is complies with a Representational State Transfer architecture), and which implements a REST-compliant API that enables monitor 210 to access log 220. In other embodiments, interface 225 may be a Simple Object Access Protocol (SOAP) interface. Interface 225 may also comprise, in embodiments, a server-based daemon that accepts requests over a port, a socket, or via e-mail. All of the aforementioned interfaces are designed to enable monitor 210 to read and parse information in log 220, and to subsequently communicate any deployment errors to management host 160.

As shown in FIG. 2, IaaS 120 also contains policies table 230. In one or more embodiments, policies table 230 is a data structure that stores one or more deployment policies. For example, an administrator may define (through some console connected to IaaS 120) a specific policy that specifies that IaaS 120 may not request a virtual machine to be instantiated in a cloud where such virtual machine has more than four virtual CPUs. Assuming this policy is stored in policies table 230, an application designer may model (using application director 110) a virtualized cloud-based application having a virtual machine with six virtual CPUs. However, if the application designer requests that the application be deployed, IaaS 120 is configured to detect that the modeled application comprises a virtual machine that violates the policy against instantiating a virtual machine having more than four virtual CPUs. Thus, the deployment request will fail, and IaaS 120, in response, writes an error record to log 220. Application management server 110 is enabled to detect the failure because, as was previously mentioned, application management server 110 includes monitor 210, which periodically reads log 220 (via interface 225) and determines whether any error in connection with the deployment request has occurred. Further, application management server 110 transmits (as part of the deployment request) VM IDs for each VM modeled as part of the virtualized application and, accordingly, embodiments of IaaS 120 write the VM ID of the virtual machine that is in violation of any policy stored in policies table 230. For this reason, application management server 110 is able to associate, using the VM ID, a policy error stored in log 220 with a virtual machine that is part of a deployment request for a virtualized application.

Assuming that a deployment request does not run afoul of any policy stored in policies table 230, IaaS 120 then transmits instantiation requests for virtual machines to cloud management server 130, based on the templates stored in the catalog of IaaS 120. In some embodiments, IaaS 120 also transmits software installation requests from application management server 110 to cloud management server 130 in order to install software in the virtual machines once those virtual machines are instantiated in the cloud. To accomplish this task, embodiments of IaaS 120 (as shown in FIG. 2) employ one or more worker threads 250. Worker threads 250 are configured to accept policy-compliant requests from application management server 110 and transmit these requests to cloud management server 130. In order to ensure an orderly flow of requests to cloud management server 130, worker threads 250 are configured to place received requests into queue 240. As shown in FIG. 2, queue 240 contains one or more VM requests 245. Each VM request 245 is transmitted to cloud management server 130. In some embodiments, cloud management server has read/write access to queue 240, and updates queue 240 as requests are processed. In other embodiments, IaaS 120 implements queue management software that manages the transmission of VM requests 245 to cloud management server 130, and subsequently updates queue 240 as such requests are transmitted.

As previously mentioned, cloud management server 130 may detect deployment errors when cloud management server 130 receives a request to instantiate virtual machines in the cloud infrastructure. For example, cloud management server 130 may determine that there is not enough available storage in order to allocate and instantiate a new virtual machine in the cloud infrastructure. In the embodiment illustrated in FIG. 2, cloud management server 130 allocates storage in order to instantiate virtual machines. This storage is allocated from VM pool 260. In embodiments, VM pool 260 is a pool of free storage whose size is measured with respect to a number of virtual machines that may be instantiated from pool storage. Thus, in the example illustrated in FIG. 2, VMs 140$_1$, 140$_2$, and 140$_3$ are instantiated as part of application 150. VM pool 260 is shown as comprising enough free storage to instantiate VMs 140$_4$-140$_n$.

In this embodiment, when cloud management server 130 receives a request to instantiate a virtual machine in the cloud, cloud management server 130 determines how many virtual machines may be instantiated from VM pool 260. If VM pool 260 has insufficient free storage space from which to allocate a requested virtual machine, then cloud management server 130 reports an error back to the requestor (i.e., IaaS 120). IaaS 120 receives the error message from cloud management server 130 and writes an error record to log 220. Further, embodiments of IaaS 120 associates requests transmitted to cloud management server 130 with a virtual machine identifier (i.e., a VM ID) that is generated and sent to it by application management server 110. According to such embodiments, IaaS 120 associates the VM ID of a virtual machine that is to be deployed to the cloud with the error received from cloud management server 130, and includes the VM ID in error written to log 220. Therefore, because application management server 110 monitors log 220 via interface 225, application management server 110 is able to associate a deployment error detected in the cloud with a virtual machine that is part of a deployment request for a virtualized application.

Figure 3:
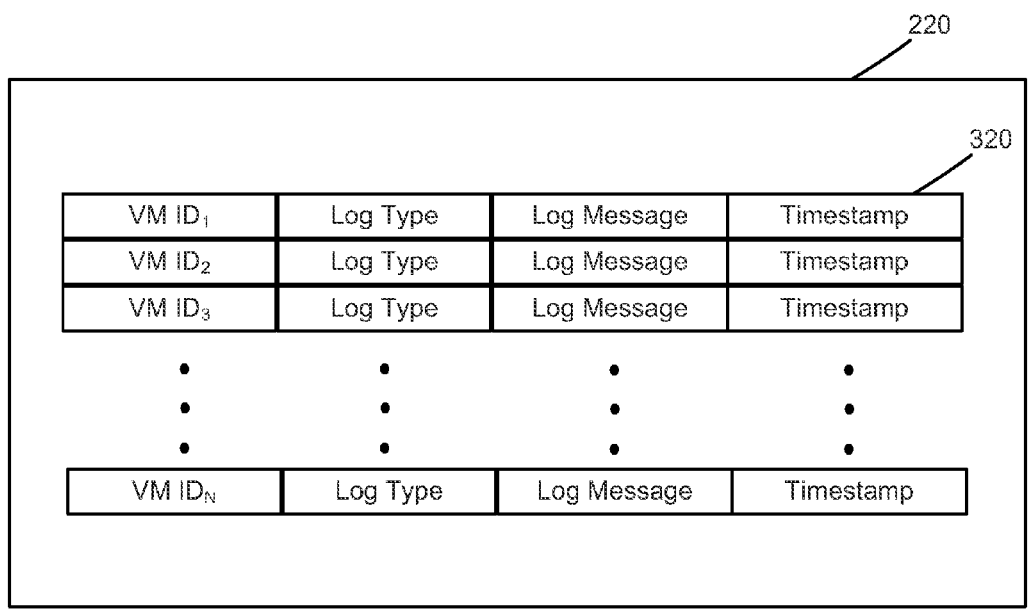
FIG. 3 is a block diagram that depicts one embodiment of a system log.

FIG. 3 is a block diagram that depicts an embodiment of log 220. As shown in FIG. 3, log 220 comprises a plurality of records. In embodiments, the records are each a fixed length. Each record comprises a fixed number of fields. A first field is reserved for a VM ID. As previously mentioned, in embodiments, application management server 110 generates VM IDs upon receiving a request to deploy a virtualized application. For each virtual machine in the virtualized application, application management server 110 generates a unique VM ID. When application management server 110 transmits a deployment request to IaaS 120, the VM IDs that correspond to the virtual machines that are to be deployed are included in the deployment request. Thus, when IaaS 120 detects a policy error in connection with a deployment request, IaaS 120 stores the VM ID (in the VM ID field of log 220) of the corresponding virtual machine that does not comply with the given policy. Further, when IaaS 120 receives an error notification from cloud management server 130 indicating that a particular virtual machine cannot be deployed to the cloud, IaaS 120 stores the VM ID of that virtual machine in the VM ID field of log 220.

A second field of the records stored in log 220 is referred to as the log type. In embodiments, this field classifies the log entry according to the type of action that gave rise to the entry. For example, if IaaS 120 receives a request to provision a virtual machine that is not in compliance with one or more policies stored in policies table 230, then IaaS 120 writes an error record to log 220. In such a case, IaaS 120 writes "Policy" in the log type field, which indicates that the log entry corresponds to an issue detected with respect to the deployment policies enforced by IaaS 120. As another example, IaaS 120 may receive an error notification from cloud management server 130 in response to a request to deploy a virtual machine. In this case, IaaS 120 writes an error record to log 220, writing "Deployment" to the log type field. This indicates that the log entry corresponds to an error detected by the cloud management software in deploying the virtual machine. It should be noted that the classification of the log entries of log 220 enable application management server 110 (via monitor 210) to efficiently filter log 220 for relevant information. For instance, embodiments of monitor 210 may be configured to only monitor for deployment or policy-related errors. In such a case, monitor 210 issues a query to interface 225 to select only log records in log 220 with a log type equal to "Deployment" or a log type equal to "Policy."

Next, a third field of a record stored in log 220 is the log message. In one or more embodiments, the log message comprises an alphanumeric string that indicates the cause of a particular error. For example, in case an application designer attempts to deploy a virtual machine having more virtual CPUs than are allowed under the policies stored in policies table 230, IaaS 120 (upon detecting the policy violation) writes an error record to log 220. For such an error, IaaS 120 may write, for example, "Number of virtual CPUs exceeds maximum allowable number." As another example, if IaaS 120 transmits a request to instantiate a virtual machine to cloud management server 130, and subsequently receives an error in response, IaaS 120 writes an error record to log 220. In embodiments, cloud management server 130 provides, in the response transmitted to IaaS 120, a message that indicates the reason a particular virtual machine cannot be instantiated in the cloud. For example, cloud management server 130 may transmit a message that indicates that there is not enough free storage in a VM pool to satisfy an instantiation request from IaaS 120. In accordance with such embodiments, IaaS 120 stores this message received from cloud management server 130 in the log message field of log record 320. In other embodiments, IaaS 120 may store a general error message in the log message field.

Finally, as shown in FIG. 3, log record 320 contains a timestamp field. According to embodiments, the timestamp field stores the date and time that an error record was written to log 220 by IaaS 120. Because (as described with respect to FIG. 2) application management server 110 monitors log 220, an end user of management host 160 may access, through user interface 165, application management server 110 to determine whether any errors occurred in connection with a request to deploy a virtualized cloud-based application. As indicated by FIG. 3, such an end user may determine which of the virtual machines in the deployment request experienced a deployment error (from the VM ID), the type and cause of the error (from the log type and log message, respectively), and the time and date of the error (from the timestamp). It should be noted that the fields of records 320 of log 220 depicted in FIG. 3 apply to one or more embodiments. Other fields that may be indicative of any errors that can occur during the deployment of a virtual machine in a cloud computing environment are contemplated and are within the scope of the present invention.

Figure 4:
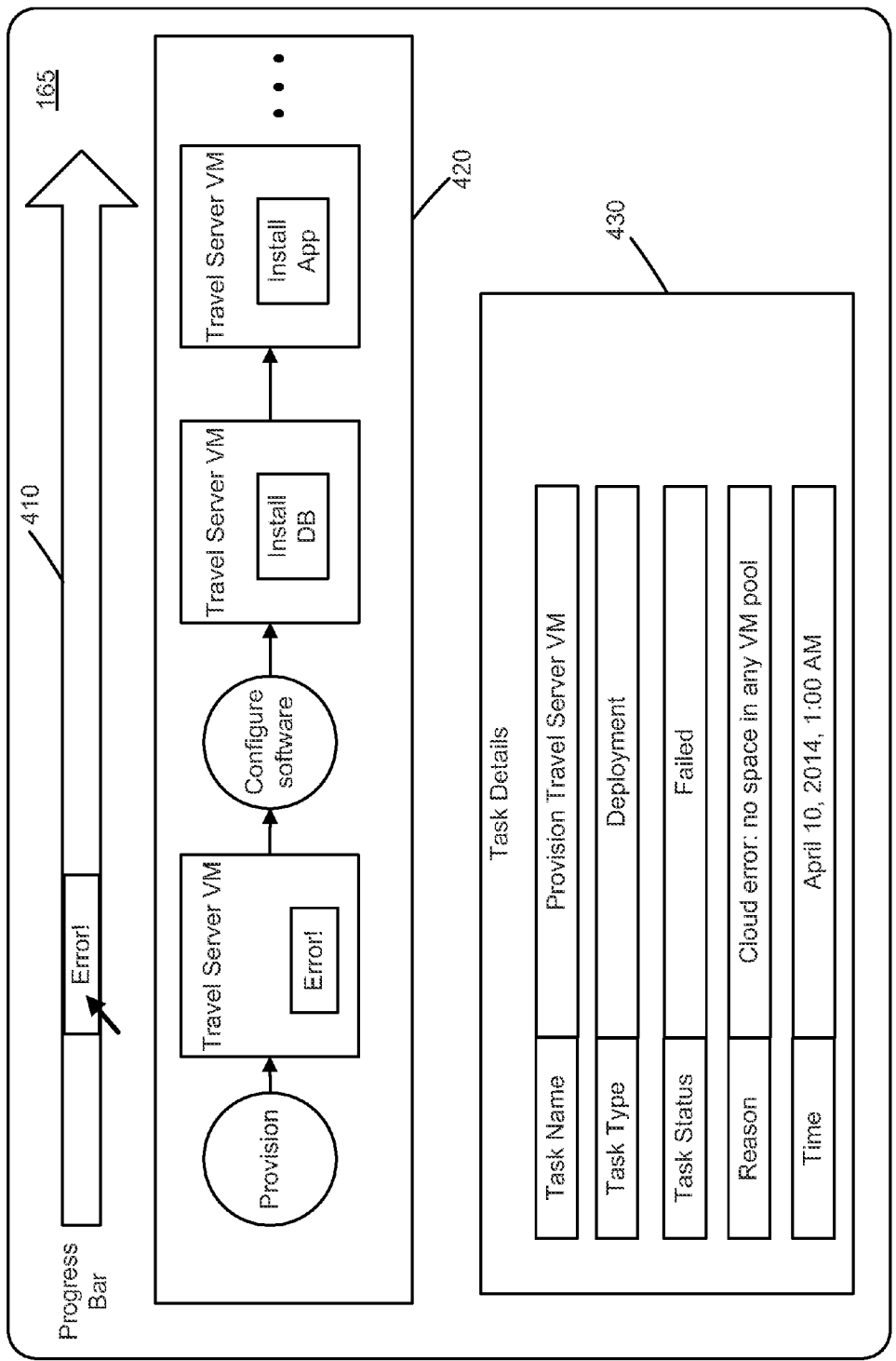
FIG. 4 is a block diagram that depicts one embodiment of a user interface displayed on a management host in order to enable examination of application deployment errors.

FIG. 4 is a block diagram that depicts an embodiment of user interface 165 of management host 160. User interface 165, among other things, provides an end user with a way to visually track the progress of a deployment of a virtualized cloud-based application. As shown in FIG. 4, user interface 165 comprises three sections. A first section 410 is a progress bar. Progress bar 410 displays to what extent a particular request for deployment has proceeded, along with the current status of the deployment. The structure of the deployment (or the "deployment plan") is displayed in section 420. That is, the individual phases of the deployment, along with the different tasks that are to be accomplished in each phase are depicted in section 420. For clarity, progress bar 410 may be viewed in conjunction with section 420. For instance, in FIG. 4, section 420 depicts a deployment plan for a travel reservation application that comprises a single virtual machine. The virtual machine has the name "Travel Server VM." As shown in FIG. 4, section 420 depicts two deployment phases: a first phase called "Provision", and a second phase called "Configure Software." The Provision phase comprises the tasks that are required to be performed by IaaS 120 and cloud management server 130 in order to provision (or instantiate) a virtual machine (corresponding to Travel Server VM) in the cloud infrastructure.

Once the Provision phase is complete, as shown by section 420, the Configure Software phase commences. The first step in this phase is to install database software on Travel Server VM. In embodiments, application management server 110 transmits a request to IaaS 120, indicating, for example, the location and installation program for the database software to be installed. This request is forwarded by IaaS 120 to cloud management server 130, which then invokes the application management server agent on the instantiated Travel Server VM in order to install the database software. Further, once the step of installing the database software on Travel Server VM is complete, application manager 110 transmits the next request to IaaS 120, namely, a request to install application software on Travel Server VM. This step proceeds in similar fashion as the database software installation step.

As described earlier, errors may occur during any of the deployment steps. These errors are captured by IaaS 120, which writes error records to log 220. Application management server 110 monitors log 220, via monitor 210. When application manager 110 determines that a deployment error has occurred, application manager 110 transmits the error to management host 160, which displays the error on user interface 165.

As shown in FIG. 4, user interface 165 illustrates that an error has occurred in the Provision phase for Travel Server VM. This error is indicated by the "Error!" field within progress bar 410. Note that the Error! field of progress bar 410 is disposed directly above the Provision phase of section 420. In one or more embodiments, the Error! field comprises a hyperlinked text field, which, as indicated in the figure, may be mouse-clicked by an end user. Upon clicking the depicted Error! field, embodiments of user interface 165 displays details section 430.

As shown in the lower part of FIG. 4, details section 430 provides information concerning the occurrence and reason for errors detecting during deployment of a virtualized cloud-based application, according to embodiments. As previously mentioned, user interface 165 renders details section 430 in response to a mouse click on the Error! field depicted within progress bar 410. Details section 430 displays the name of the task that experienced the error in question. In FIG. 4, the task name is "Provision Travel Server VM." Next, details section 430 displays the task type. In FIG. 4, the depicted task type is "Deployment." This corresponds to the log type field of log record 320, which is described with respect to FIG. 3. For example, when IaaS 120 receives an error message from cloud management server 130 in response to an instantiation request transmitted thereto, IaaS 120 stores a log record 320 in log 220 with log type field set to "Deployment." As previously mentioned, this indicates that the particular error corresponds to a problem deploying a particular virtual machine to a target cloud computing infrastructure. By contrast, if the task type field displays "Policy," this indicates that the requested virtual machine violates a policy enforced by IaaS 120.

Details section 430 also displays a task status field. In FIG. 4, the task status is "Failed." Because some errors detected during deployment may be recoverable, not all errors result in the failure of a deployment. In embodiments, application management server 110 implements software that, when executed, determines whether or not a particular error record found in log 220 is a fatal error that results in a failed deployment of the corresponding virtual machine. For instance, in such embodiments, application management server 110 maintains a locally stored list of (potential) fatal errors that cause a particular application deployment to fail. Such embodiments of application management server 110 are configured to read a log message that corresponds to a particular error record in log 220 and, after having read the error record, to determine whether the log message matches (or otherwise corresponds to) one of the fatal errors maintained in the locally configured list.

As shown in FIG. 4, details section 430 also includes a section that displays the reason a particular error occurred. In the embodiment shown, the reason that the task "Provision Travel Server VM" failed is due to the fact that there is not enough storage space in any VM pool in the cloud infrastructure platform sufficient to support the instantiation of the VM. According to embodiments, the reason depicted in details section 430 corresponds to the log message field of log record 320. In addition, details section 430 includes a time field, which corresponds to the timestamp field of log record 320. When an end user of user interface 165 (e.g., and application designer or administrator) inspects detail section 430, the end user may determine what the cause of a particular error is and repair the error. Alternatively, the end user may choose to abandon the deployment or to forego deploying one or more problematic components of an application. User interface 165 affords the end user the opportunity to determine one of these courses of action before the full application plan depicted in section 420 is executed, thereby conserving system resources.

Figure 5:
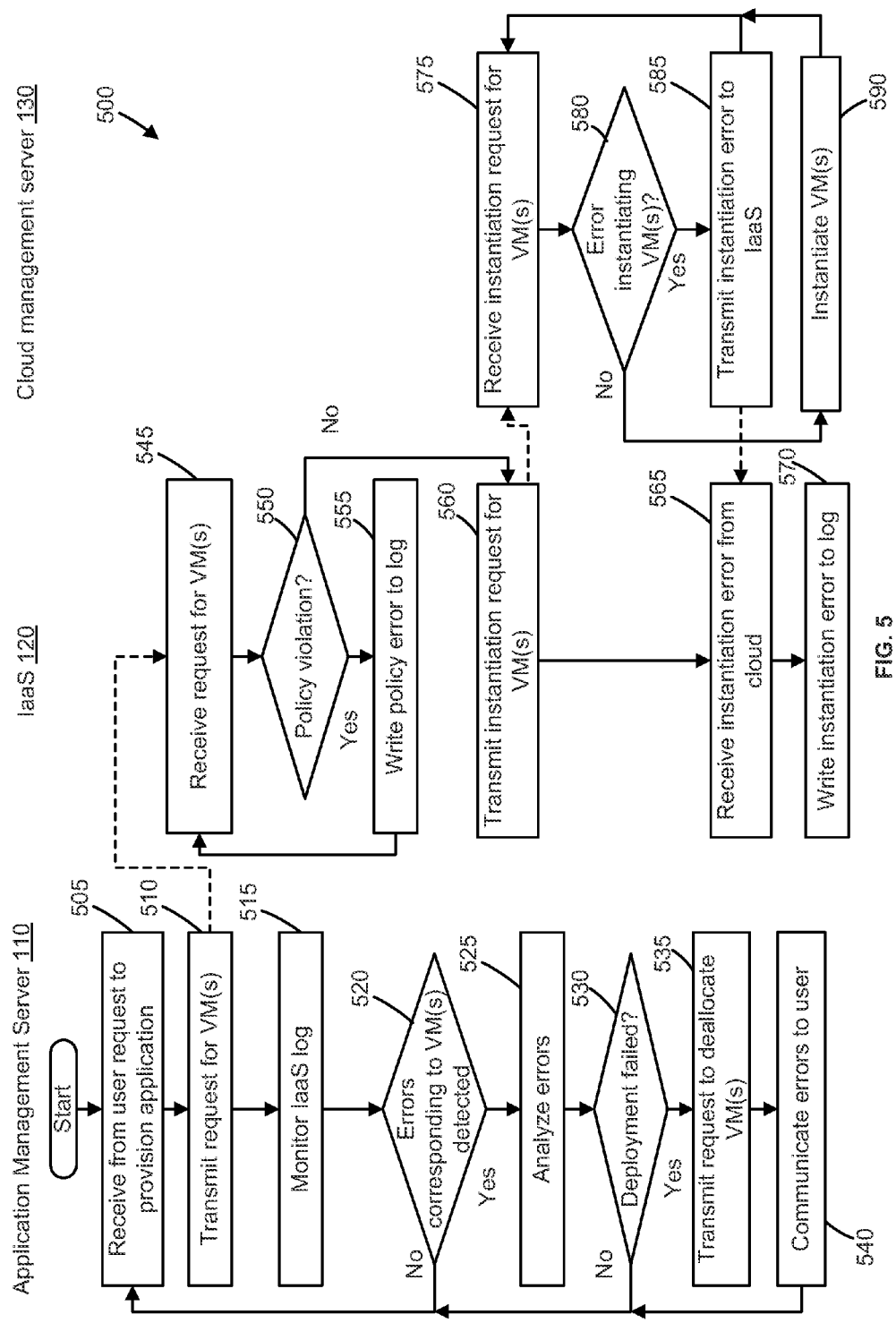
FIG. 5 is a flow diagram of a method for detecting and capturing errors during the deployment of a virtualized cloud-based application, according to one or more embodiments.

FIG. 5 is a flow diagram of a method 500 of detecting and capturing errors during the deployment of a virtualized cloud-based application, according to one or more embodiments. As shown in FIG. 5, the steps of method 500 are carried out by three components: application management server 110, IaaS 120, and cloud management server 130. It should be noted that, in some instances, one or more steps carried out by each of the components may be performed in parallel with steps performed by other components.

Method 500 begins at step 505, where application management server 110 receives a request from an end user to deploy a virtualized cloud-based application. Such a request is received, according to embodiments, from an end user of management host 160. The request comprises instructions to deploy one or more virtual machines to a cloud infrastructure platform, and includes identifiers for the virtual machines. Method 500 then proceeds to step 510, where application management server 110 transmits one or more requests to IaaS 120 to instantiate VMs in the cloud computing platform. The transmission of this request is denoted in FIG. 5 by the dashed arrow between step 510 and step 545 (which is carried out by IaaS 120).

At step 545, IaaS 120 receives the one or more requests transmitted by application management server 110. Next, method 500 proceeds to step 550, where IaaS 120 determines whether one or more of the received instantiation requests violates any deployment policies. For example, in the embodiment depicted in FIG. 2, IaaS 120 determines policy violations based on policies stored in polices table 230. As previously mentioned, an example of a policy violation is a request to instantiate a virtual machine having more virtual CPUs than some predetermined policy-enforced limit.

If, at step 550, IaaS 120 determines that one or more of the received requests violate a deployment policy, then IaaS writes an error record (log record 320) to log 220. Since the error corresponds to a policy violation, the log type of the log record is set to "Policy." Further, the VM ID field of the log record is set to the virtual machine identifier that corresponds to the virtual machine that is not in compliance with the policy. Method 500 then returns to step 545, where IaaS 120 receives further VM instantiation requests.

If, however, IaaS 120 determines that the received VM instantiation requests do not violate any policy, then method 500 proceeds to step 560. At step 560, IaaS 120 transmits the one or more instantiation requests to cloud management server 130. As previously mentioned, IaaS 120 transmits, as part of the instantiation request, information related to VM templates stored therein to cloud management server 120, which enables cloud management server 120 to properly instantiate VMs in the cloud computing infrastructure. The transmission of the instantiation request from IaaS 120 to cloud management server 120 is depicted as the dashed arrow that connects step 560 to step 575 in FIG. 5.

Method 500 proceeds to step 575, which is performed by cloud management server 130. At step 575, cloud management server 130 receives the instantiation request transmitted by IaaS 120. Proceeding to step 580, cloud management server 130 determines whether there is an error in connection with instantiating one or more of the VMs specified in the received requests. Examples of instantiation errors include insufficient storage to instantiate VMs in the cloud, insufficient available CPU resources in the cloud, and the like. If, at step 580, cloud management server 130 determines that there is an error instantiating one or more of the VMs, then cloud management server 130 transmits, at step 585, an instantiation error notification to IaaS 120. This error is depicted in FIG. 5 as the dashed arrow that connects step 585 to step 565. Method 500 then returns to step 575, where cloud management server 130 receives further instantiation requests from IaaS 120.

If however, cloud management server determines, at step 580, that there are no errors instantiating any of the requested VMs, then method 500 proceeds to step 590. At step 590, cloud management server successfully instantiates the requested VMs in the cloud infrastructure. Method 500 then returns to step 575, where cloud management server 130 receives further instantiation requests from IaaS 120.

As shown in FIG. 5, after IaaS 120 transmits one or more instantiation requests to cloud management server 130 at step 560, method 500 proceeds to step 565, where IaaS 120 receives an instantiation error from cloud management server 130. As previously described, the error received by IaaS 120 may contain an indication as to the nature and cause of the instantiation error. Next, method 500 proceeds to step 570, where IaaS 120 writes log record to log 220, which corresponds to the received instantiation error. It should be noted that, in embodiments, the log message in the log record is set to correspond to any message that is stored within the instantiation error received from cloud management server 130. Further, because IaaS 120 receives virtual machine identifiers (i.e., VM IDs) from application management server 110, IaaS 120 sets the VM ID field in the log record written to log 220 to the VM ID that identifies the virtual machine that cloud management server 130 failed to instantiate.

Once IaaS 120 writes the instantiation error to log 220, method 500 returns to step 545, where IaaS 120 receives further instantiation requests form application management server 110.

As shown in the embodiment of FIG. 5, application management server 110 carries out one or more steps in parallel with steps carried out by IaaS 120 and cloud management server 130. After application management server 110 transmits one or more requests to IaaS 120 to instantiate VMs on the cloud infrastructure platform, method 500 proceeds to step 515, where application management server 110 monitors IaaS log 220. As depicted in FIG. 3, embodiments of application management server 110 include a monitor 210, which is a software module configured to monitor system logs. Further, monitor 210 accesses log 220 via an interface, which, in embodiments, implements a REST API that monitor 210 uses to access the log.

Method 500 then proceeds to step 520, where application management server 110 determines whether there are error records corresponding to the requested VMs stored in log 220. In embodiments, application management server 110 monitors log 220 based on VM IDs, which, as previously mentioned, application management server 110 generates and transmits to IaaS 120. Further, each VM ID uniquely identifies a virtual machine specified in the requests received by application management server 110. When IaaS 120 is notified of an instantiation error in the cloud infrastructure, or if IaaS 120 detects a policy violation in connection with the instantiation request, then IaaS 120 writes a log record to log 220, storing the VM ID of the virtual machine that could not be instantiated in the log record. If application management server 110 determines that log 220 contains error records that correspond to one or more of the requested VMs, then method 500 proceeds to step 525. If, on the other hand, application management server 110 determines that there are no errors recorded in log 220 that correspond to any of the requested VMs, then method 500 proceeds back to step 505, where application management server 110 receives further application deployment requests.

At step 525, application management server 110 analyzes the errors to determine which of the requested VMs failed to deploy, and whether or not the error results in a failed deployment. As previously mentioned, some errors may be determined to be recoverable, while other errors may be determined to be fatal errors. As mentioned above, the analysis performed at step 525, according to one or more embodiments, consists of application management server 110 maintaining a locally stored list of potential fatal errors, and then matching one or more errors captured in log 220 with the fatal errors contained in the locally stored list.

If, at step 530, application management server 110 determines that the deployment has failed (i.e., that an unrecoverable error has occurred), then method 500 proceeds to step 535. However, if application management server 110 determines that the deployment has not failed, then method 500 proceeds back to step 505, where application server 110 receives further application deployment requests.

At step 535, one or more embodiments of application management server 110 transmits a request to either IaaS 120 or to cloud management server 130 to deallocate any already allocated VMs in the cloud. This step is performed to conserve cloud resources. Some application deployments entail the instantiation of hundreds of VMs. If a single mission critical VM fails to properly deploy, while many other VMs successfully deploy, the application will not run properly. Thus, to free up cloud infrastructure resources (e.g., RAM and storage space), embodiments of the present invention provide for the automatic deallocation of VMs that are allocated to an improperly deployed application. However, other embodiments do not provide for automatic deallocation of VMs. These embodiments leave the decision as to whether or not to deallocate VMs to an application designer or to a system administrator.

Next, at step 540, application designer communicates the detected errors to the end user that initiated the deployment request received at step 505. In embodiments, the error or errors are transmitted to management host 160, which then renders user interface 165 to display the errors to an end user. Depending upon the nature of the errors, the end user may choose to continue deployment, abandon the deployment, or modify the deployment. One example of how user interface 165 displays deployment errors to an end user is depicted in FIG. 4.

Method 500 then proceeds back to step 505, where application management server receives further deployment requests, which typically correspond to other modeled applications.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of tracking errors deploying applications to a cloud computing environment, the cloud computing environment comprising a cloud deployment platform with first and second deployment modules executing thereon and a cloud management server configured to manage a plurality of virtual machines deployed in a cloud infrastructure, the method comprising:
   receiving a request to provision an application;
   generating, by the first deployment module, a unique identifier for a first virtual machine on which the application is configured to execute;
   transmitting by the first deployment module to the second deployment module a request to deploy the first virtual machine, the request including the virtual machine identifier;
   detecting an occurrence of a deployment error corresponding to the first virtual machine by one of the second deployment module and the cloud management server;
   monitoring, by the first deployment module, a log based on the identifier for the first virtual machine, the log containing an error record that identifies the occurrence of the deployment error corresponding to the first virtual machine; and
   generating, by the first deployment module, an error message corresponding to the first virtual machine on which the application is configured to execute, based on the monitoring.

2. The method of claim 1, further comprising:
   determining, by the second module, that the request to instantiate the first virtual machine violates a deployment policy associated with the cloud deployment platform; and
   responsive to determining the policy violation, writing, by the second module, the error record in the log, wherein the error record includes an indicator of the policy violation.

3. The method of claim 1, further comprising:
   detecting, by the second module, a failure to instantiate the first virtual machine in the cloud infrastructure; and
   responsive to detecting the failure, writing the error record in the log, wherein the error record includes an indicator of the failure.

4. The method of claim 3, further comprising:
   transmitting, by the second module, a request to instantiate the first virtual machine to the cloud management server, wherein detecting the failure to instantiate the first virtual machine in the cloud infrastructure comprises receiving, by the second module, an instantiation error notification from the cloud management server.

5. The method of claim 4, wherein the received instantiation error notification indicates that there are insufficient resources in the cloud infrastructure available to instantiate the first virtual machine.

6. The method of claim 1, wherein the monitoring comprises:
   transmitting, by the first deployment module, a request to a data interface associated with the log.

7. The method of claim 1, further comprising:
   transmitting, by the first deployment module to the second deployment module, a request to deallocate resources previously allocated in the cloud infrastructure that are associated with the deployment request.

8. The method of claim 1, further comprising:
   transmitting, by the first deployment module, the generated error message to a management host, wherein the management host is configured to display information corresponding to the error message in a user interface.

9. A non-transitory computer-readable medium comprising instructions executable by one or more hosts in a cloud computing environment, the cloud computing environment comprising a cloud deployment platform with first and second deployment modules executing thereon and a cloud management server configured to manage a plurality of virtual machines deployed in a cloud infrastructure, where the instructions, when executed, cause the one or more hosts to perform a method of tracking application deployment errors, the method comprising:
   receiving a request to provision an application;
   generating, by the first deployment module, a unique identifier for a first virtual machine on which the application is configured to execute;
   transmitting by the first deployment module to the second deployment module a request to deploy the first virtual machine, the request including the virtual machine identifier;
   detecting an occurrence of a deployment error corresponding to the first virtual machine by one of the second deployment module and the cloud management server;
   monitoring, by the first deployment module, a log based on the identifier for the first virtual machine, the log containing an error record that identifies the occurrence of the deployment error corresponding to the first virtual machine; and
   generating, by the first deployment module, an error message corresponding to the first virtual machine on which the application is configured to execute, based on the monitoring.

10. The computer-readable medium of claim 9, wherein the method further comprises:
    determining, by the second module, that the request to instantiate the first virtual machine violates a deployment policy associated with the cloud deployment platform; and responsive to determining the policy violation, writing, by the second module, the error record in the log, wherein the error record includes an indicator of the policy violation.

11. The computer-readable medium of claim 9, wherein the method further comprises:
   detecting, by the second module, a failure to instantiate the first virtual machine in the cloud infrastructure; and
   responsive to detecting the failure, writing the error record in the log, wherein the error record includes an indicator of the failure.

12. The computer-readable medium of claim 11, wherein the method further comprises:
   transmitting, by the second module, a request to instantiate the first virtual machine to the cloud management server, wherein detecting the failure to instantiate the first virtual machine in the cloud infrastructure comprises receiving, by the second module, an instantiation error notification from the cloud management server.

13. The computer-readable medium of claim 12, wherein the received instantiation error notification indicates that there are insufficient resources in the cloud infrastructure available to instantiate the first virtual machine.

14. The computer-readable medium of claim 9, wherein the monitoring comprises:
   transmitting, by the first deployment module, a request to a data interface associated with the log.

15. The computer-readable medium of claim 9, wherein the method further comprises:
   transmitting, by the first deployment module to the second deployment module, a request to deallocate resources previously allocated in the cloud infrastructure that are associated with the deployment request.

16. The computer-readable medium of claim 9, wherein the method further comprises:
   transmitting, by the first deployment module, the generated error message to a management host, wherein the management host is configured to display information corresponding to the error message in a user interface.

17. A virtualized cloud computing system, comprising:
   one or more host computers that implement a cloud deployment platform with first and second modules executing thereon;
   a plurality of host computers executing in a cloud infrastructure, each configured to execute one or more virtual machines therein; and
   a cloud management server configured to manage the virtual machines in the cloud infrastructure; and
   a management host configured with a user interface, wherein the system is configured to perform a method of tracking application deployment errors, the method comprising:
   receiving a request to provision an application;
   generating, by the first deployment module, a unique identifier for a first virtual machine on which the application is configured to execute;
   transmitting by the first deployment module to the second deployment module a request to deploy the first virtual machine, the request including the virtual machine identifier;
   detecting an occurrence of a deployment error corresponding to the first virtual machine by one of the second deployment module and the cloud management server;
   monitoring, by the first deployment module, a log based on the identifier for the first virtual machine, the log containing an error record that identifies the occurrence of the deployment error corresponding to the first virtual machine; and
   generating, by the first deployment module, an error message corresponding to the first virtual machine on which the application is configured to execute, based on the monitoring.

18. The system of claim 17, wherein the method further comprises:
   detecting, by the second module, a failure to instantiate the first virtual machine in the cloud infrastructure; and
   responsive to detecting the failure, writing the error record in the log, wherein the error record includes an indicator of the failure.

19. The system of claim 18, wherein the method further comprises:
   transmitting, by the second module, a request to instantiate the first virtual machine to the cloud management server, wherein detecting the failure to instantiate the first virtual machine in the cloud infrastructure comprises receiving, by the second module, an instantiation error notification from the cloud management server.

20. The system of claim 17, wherein the method further comprises:
   transmitting, by the first deployment module, the generated error message to the management host, wherein the management host is configured to display information corresponding to the error message in a user interface.

* * * * *